United States Patent
Umemoto et al.

(10) Patent No.: US 6,773,620 B2
(45) Date of Patent: Aug. 10, 2004

(54) OXIDE MAGNETIC MATERIAL AND PRODUCTION METHOD OF THE SAME

(75) Inventors: Takashi Umemoto, Osaka (JP); Hideki Yoshikawa, Hyogo (JP); Hitoshi Hirano, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/448,000

(22) Filed: May 30, 2003

(65) Prior Publication Data

US 2003/0224154 A1 Dec. 4, 2003

(30) Foreign Application Priority Data

May 31, 2002 (JP) .......................... 2002-160307
Jun. 4, 2002 (JP) .......................... 2002-163056

(51) Int. Cl.[7] ................................................ H01R 1/10
(52) U.S. Cl. ............................. 252/62.63; 252/62.58; 428/689; 428/694 GT
(58) Field of Search .................. 252/62.58, 62.63, 252/62.62; 428/689, 694 GT

(56) References Cited

U.S. PATENT DOCUMENTS

| | | | | |
|---|---|---|---|---|
| 5,607,615 A | * | 3/1997 | Taguchi et al. | .......... 252/62.63 |
| 5,811,024 A | * | 9/1998 | Taguchi et al. | .......... 252/62.63 |
| 5,846,449 A | * | 12/1998 | Taguchi et al. | .......... 252/62.62 |
| 6,139,766 A | * | 10/2000 | Taguchi et al. | .......... 252/62.57 |
| 6,248,253 B1 | * | 6/2001 | Taguchi et al. | .......... 252/62.63 |
| 6,402,980 B1 | * | 6/2002 | Taguchi et al. | .......... 252/62.63 |

FOREIGN PATENT DOCUMENTS

| | | |
|---|---|---|
| JP | 06-310322 | 11/1994 |
| JP | 08-031627 | 2/1996 |
| JP | 09-110432 | 4/1997 |
| JP | 09-167703 | 6/1997 |
| JP | 2002-015913 | 1/2002 |

* cited by examiner

*Primary Examiner*—Cathy Lam
(74) *Attorney, Agent, or Firm*—Arent Fox PLLC

(57) ABSTRACT

An oxide magnetic material of the invention is an oxide magnetic material of a hexagonal ferrite containing Sr, has grain boundary phases in the surrounding of the crystal grains, contains not less than 2% by weight, preferably not less than 5% by weight, of Sr in the grain boundary phases and not less than 10% by weight, preferably not less than 25% by weight, of at least one additive element selected from Bi, V, B and Cu.

14 Claims, 3 Drawing Sheets

2 μm

OXIDE MAGNETIC MATERIAL AND PRODUCTION METHOD OF THE SAME

BACKGROUND OF THE INVENTION

1. Field of the Invention

The invention relates to an oxide magnetic material usable for a multilayer inductor and a laminated ceramic substrate and the like in a high frequency circuit member and the like and its production method.

2. Related Art

With the recent trend of miniaturization and use of higher frequency of electronic apparatus, a magnetic material usable in a high frequency band is more and more needed. As such a magnetic material for high frequency, NiCuZn-series spinel ferrites have been conventionally used, however in the case of frequency of several hundred MHz or higher, they cause natural resonance to result in increase of the loss and become incapable of practically working as magnetic materials. As a magnetic material usable up to a GHz band, hexagonal ferrites with high magnetic anisotropy defined as $Ba_3Me_2Fe_{24}O_{42}$ (Me: a bivalent metal) and the like can be exemplified. Further, in order to improve the high frequency properties by improving the anisotropy, it is tried to replace some of Ba in the above-mentioned hexagonal type ferrites with Sr.

However, in the GHz band, the imaginary component ($\mu''$) of the magnetic permeability becomes so significant as to increase the loss for use such ferrites for inductors.

Also, in a high frequency circuit member, use of a laminated ceramic substrate comprising a magnetic ceramic substrate and a dielectric ceramic substrate laminated on each other has been tried for miniaturization. With respect to such a laminated ceramic substrate, the patterned wiring of a capacitor is formed on a dielectric ceramic substrate and the patterned wiring of an inductor is formed on a magnetic ceramic substrate.

FIG. 4 is a perspective view showing one example of such a laminated ceramic substrate and FIG. 5 is an exploded perspective view. As illustrated in FIG. 4 and FIG. 5, the laminated ceramic substrate is composed by laminating a plurality of ceramic substrates 3 and 4. A plurality of wiring patterns 11 composing inductors and capacitors are formed on the surfaces of the respective ceramic substrates 3 and 4 by a screen-printing method or the like.

In the case the ceramic substrates 3 are magnetic ceramic substrates and the ceramic substrates 4 are dielectric ceramic substrates, the wiring patterns 11 composing the inductors are formed on the magnetic ceramic substrates 3 and wiring patterns 11 composing the capacitors are formed on the dielectric ceramic substrates 4. The wiring patterns 11 between the substrates are connected through via holes 12.

After laminated, these ceramic substrates 3 and 4 are united by firing at a high temperature to obtain a laminated ceramic substrate.

In the case the wiring patterns 11 are formed by using Ag or the like with a high conductivity, it is required to carry out firing at a temperature as low as about 900° C. If firing is carried out at a high temperature, the shape of the wiring patterns of Ag or the like is deformed to make it impossible to form desired circuits on the respective substrates.

However, a conventional magnetic ceramic material like a hexagonal ferrite or the like has a suitable firing temperature of 1,300° C. or higher, and it has a problem that good magnetic properties cannot be obtained in the case firing is carried out at a temperature as low as about 900° C.

It has been tried to carry out firing at a low temperature by adding a sintering aid such as $B_2O_3$, CuO, and $Bi_2O_3$, neither sufficient effect on low temperature firing has been obtained yet nor the magnetic loss has been lowered sufficiently. Especially, with respect to a hexagonal ferrite in which some of Ba's are replaced with Sr's, any sufficient effect has not been obtained so far.

SUMMARY OF THE INVENTION

The object of the present invention is to provide an oxide magnetic material which can be produced by firing at a low temperature and has good magnetic properties in a high frequency band and its production method.

The oxide magnetic material of the invention is a Sr-containing oxide magnetic material having grain boundary phases in crystal grains, containing not less than 2% by weight of Sr in the grain boundaries and not less than 10% by weight of at least one element selected from Bi, V, B and Cu.

With respect to the oxide magnetic material of the invention, existence of not less than 2% by weight of Sr in the grain boundaries and not less than 10% by weight of the above-mentioned elements in the material can decrease the magnetic loss and give good magnetic properties. Further, the oxide magnetic material can be produced by firing at a low temperature.

The content of Sr in the grain boundary phases is preferably not less than 2% by weight, more preferably not less than 5% by weight and its upper limit is preferably not more than 30% by weight. When the content of Sr in the grain boundary phases is less than 2% by weight, shrinkage after firing at a temperature as low as about 900° C. is scarcely observed and a specimen after firing is unsatisfactory in the mechanical strength or the like and the magnetic loss is increased. On the other hand, if the Sr content exceeds 30% by weight, the content of other elements such as Bi and the like is relatively decreased, so that densification in the case of low temperature firing sometimes does not take place.

The content of the additive elements in the grain boundary phases is preferably not less than 10% by weight, more preferably not less than 25% by weight and its upper limit is not more than 70% by weight. If the content of additive elements is less than 10% by weight, shrinkage after firing at a temperature as low as about 900° C. is scarcely observed and a specimen after firing is unsatisfactory in the mechanical strength or the like and the magnetic loss is increased. On the other hand, if the content of additive elements exceeds 70% by weight, the magnetic permeability (a real component) decreases in some cases.

As for the additive elements, use of Bi is especially preferred. The additive elements may be contained in an oxide magnetic material by adding oxides containing the additive elements to a preliminarily baked powder obtained by preliminarily baking a raw material powder of the oxide magnetic material and firing the obtained mixture. The oxides containing the additive elements include $Bi_2O_3$, $V_2O_5$, $B_2O_3$, CuO, and the like. The content of the additive elements in the grain boundary phases can be adjusted by adjusting the amount of the oxides to be added to a preliminarily baked powder.

In the invention, together with the oxides containing additive elements, an oxide containing Sr may be added to the preliminarily baked powder and the obtained mixture may be fired to add Sr in the oxide magnetic material. Addition of the oxide containing Sr to the preliminarily baked powder increases the content of Sr especially in grain boundary phases. The content of Sr in the grain boundary phases can be also controlled by changing the pulverizing and mixing conditions at the time of pulverizing and mixing the preliminarily baked powder and the oxide containing Sr. For example, if the mixing is carried out for a long duration, the content of Sr in the grain boundary phases can be increased. Further, the content of Sr in the grain boundary phases can be controlled by changing the temperature at the time of preliminarily baking the raw material powder of the oxide magnetic material. That is, if the preliminarily baking temperature is decreased, the content of Sr in the grain boundary phases can be increased.

In the invention, Si may be contained further in the grain boundary phases. The content of Si in the grain boundary phases is preferably not less than 2% by weight, more preferably not less than 3% by weight and its upper limit is preferably not more than 20% by weight. Existence of Si in the grain boundary phases increases the shrinkage ratio of a fired oxide magnetic material and improves the magnetic properties. If the content of Si in the grain boundary phases is less than 2% by weight, the effect of Si-coated to suppress the loss is sometimes insufficient (that is, the value of $\mu'/\mu''$ becomes low). Meanwhile, if the content of Si exceeds 20% by weight, the value of permeability (the real component) tends to be significantly decreased.

Si can be contained in the grain boundary phases by adding an oxide containing Si together with oxides containing additive elements to the preliminarily baked powder of the oxide magnetic material and firing the resulting mixture. Incidentally, it is no need for Si in the grain boundary phases to exist evenly in the grain boundary phases but Si may exist unevenly in some portions of the grain boundary phases. For example, additive elements of such as Bi may exist more in some portions of the grain boundary phases, and Si may exist more in some other portions.

In the invention, the oxide magnetic material may contain a Group Ia element or a Group IIa element of a periodic table. Practical examples of the Group Ia element and the Group IIa element of a periodic table include Ca, K, Na, Sr, and Ba. Among them, Ca is preferable especially.

A Group Ia element or a Group IIa element can be contained in the oxide magnetic material by adding an additive, a compound of the Group Ia element or the Group IIa element with a Group VIIb element of a periodic table, together with oxides containing additive elements to the preliminarily baked powder of the oxide magnetic material and firing the resulting mixture.

The crystal grains of the oxide magnetic material of the invention preferably have an average grain diameter of 0.01 $\mu$m or large and 3 $\mu$m or smaller. The average grain diameter of the crystal grains can be measured from a cross-sectional photograph taken by a scanning electron microscope (SEM). More practically, it can be calculated by subjecting the cross-sectional photograph of a SEM to image processing to calculate the surface areas of the respective crystal grains and calculating the respective diameters of circles from them by assuming the crystal grains to be true circles. If the average crystal grain diameter is larger than 3 $\mu$m, shrinkage after firing at a temperature as low as about 900° C. is scarcely observed and a specimen after firing is unsatisfactory in the mechanical strength or the like and the magnetic loss is increased in some cases. On the other hand, if the average crystal grain diameter is minute, smaller than 0.01 $\mu$m, the crystal grains are easily agglomerated to make it difficult to obtain a slurry in which a magnetic material is evenly dispersed in some cases.

In the invention, the oxide magnetic material is preferably a hexagonal ferrite. Practically, the crystal grains are preferable to have a crystal structure of a hexagonal ferrite. It is further preferable for the hexagonal ferrite to have Z phase defined as $M_3Me_2Fe_{24}O_{41}$ (M denotes Ba and/or Sr; and Me denotes a bivalent metal) as a main phase. Further, the main phase is preferably defined as $(Sr_xBa_{1-x})_3Me_2Fe_{24}O_{41}$ (x is a value satisfying $0 \leq x \leq 1$).

A production method of the invention is a production method capable of producing the above-mentioned oxide magnetic material of the invention and involves steps of preparing a preliminarily baked powder by preliminarily baking a raw material powder of an oxide magnetic material, preparing a mixed powder by mixing an oxide containing at least one additive element selected from Bi, V, B, and Cu with the preliminarily baked powder, and firing the mixed powder, and it is characterized that Sr is contained in grain boundary phases existing in the surrounding of the crystal grains of the resulting oxide magnetic material after firing.

As oxides containing the additive elements, those described above with respect to the foregoing oxide magnetic material of the invention can be used.

In the production method of the invention, together with the oxides containing the additive elements, an oxide containing Sr may be mixed with the preliminarily baked powder. The content of Sr in the grain boundary phases can be controlled by controlling the addition amount of the oxide containing Sr. Practically, the content of Sr in the grain boundary phases can be increased by increasing the addition amount.

In the production method of the invention, oxides containing additive elements and/or an oxide containing Sr is added to and mixed with the preliminarily baked powder and in this case, it is generally preferable to carry out the mixing while pulverization by a ball mill or the like being simultaneously carried out. At that time, the conditions for pulverization and mixing are controlled, so that the content of Sr in the grain boundary phases can be controlled. For example, if the mixing duration is prolonged, the content of Sr in the grain boundary phases can be increased.

Also, the content of Sr in the grain boundary phases can be controlled by controlling the temperature for the preliminary baking. Practically, by lowering the preliminary baking temperature is increased the content of Sr in the grain boundary phases.

Further, in the production method of the invention, together with the oxides containing additive elements, an oxide containing Si may be mixed with the preliminarily baked powder. Si can be contained in the grain boundary phases by mixing the oxide containing Si with the preliminarily baked powder.

Also, in the production method of the invention, together with the oxides containing additive elements, an additive, a compound of the Group Ia element or the Group IIa element with a Group VIIb element, may be added to the preliminarily baked powder of the oxide magnetic material. Addition of such an additive to the preliminarily baked powder makes the Group Ia element of the Group IIa element contained in the oxide magnetic material.

The melting point of the additive is preferably 900° C. or lower. Practical examples of the additive with a melting point of 900° C. or lower include $CaCl_2$ (melting point of 772° C.), KF (melting point of 830° C.), KI (melting point of 723° C.), NaCl (melting point of 800° C.), NaI (melting point of 651° C.), $SrBr_2$ (melting point of 643° C.), $SrCl_2$ (melting point of 873° C.), $BaBr_2$ (melting point of 847° C.), $BaI_2$ (melting point of 740° C.), and the like. Among them, $CaCl_2$ is preferable to be used especially.

The addition amount of the additive is preferably not more than 25% by weight in the preliminarily baked powder. That is, the amount is preferably 33.3 part by weight to 100 part by weight of the preliminarily baked powder. If the addition amount of the additive exceeds 25% by weight, the ratio of the magnetic ceramic material is relatively decreased so that the magnetic properties tend to be deteriorated. The addition amount of the additive is further preferably 0.05 to 25% by weight, furthermore preferably 0.05 to 1% by weight. If the addition amount of the additive is too low, any sufficient effect to provide good magnetic properties by low temperature firing cannot be obtained in some cases.

In the production method of the invention, the mixed powder can be fired after being formed into a substrate-like shape. Accordingly, a magnetic substrate can be produced. As a method to be employed for forming the mixed powder into the substrate-like shape, a method involving adding a binder to the mixed powder, producing a slurry of the resulting powder mixture, and forming a green sheet from the slurry can be exemplified. Further, after a binder is added to the mixed powder, the resulting powder mixture may be press-formed to make the substrate-like shape.

After the green sheet formed into the substrate-like shape is laminated on a substrate-like green sheet produced from another material such as a dielectric material or the like, the obtained laminated body may be fired. Consequently, a laminated ceramic substrate comprising the magnetic substrate and a substrate made of another material such as a dielectric can be obtained.

Wiring patterns can be formed by a screen-printing method or the like on the substrate-like green bodies before firing. Further, via holes and the like can be formed, too.

Since the oxide magnetic material of the invention can be fired at a low firing temperature, a material such as Ag can be used as a material for wiring patterns.

DESCRIPTION OF THE PREFERRED EMBODIMENTS

Hereinafter, the invention will be described along with practical examples, however the invention is not limited to the following examples.

EXAMPLES 1 to 5

Using BaO, SrO, CoO, and $Fe_2O_3$ as raw material powders, the respective raw material powders were weighed so as to adjust the Sr replacement ratio x to be x=0, x=0.25, x=0.5, x=0.75, and x=1 in the following stoichiometric composition; $(Sr_xBa_{1-x})_3Co_2Fe_{24}O_{41}$ and the weighed raw material powders were mixed while being pulverized by a ball mill comprising a pot and balls made of zirconia for 24 hours. The obtained mixed powders were preliminarily baked at 1,250° C. (in the case x=0, at 1,300° C.) for 2 hours to obtain primarily baked powders of hexagonal ferrites with the Z-type structure defines as $(Sr_xBa_{1-x})_3Co_2Fe_{24}O_{41}$ (x=0, x=0.25, x=0.5, x=0.75, or x=1).

After 5 part by weight of a $Bi_2O_3$ powder and 1 part by weight of a SrO powder were added to 96 part by weight of each obtained preliminarily baked powder, the resulting powder mixture was mixed while being pulverized by a ball mill comprising a pot and balls made of zirconia. To each obtained mixed powder were added an organic solvent and a PVA-based binder and again wet mixing was carried out by a ball mill. The PVA-based binder was added so as to be in an amount of 5% by weight.

After the wet mixing, each powder obtained through drying and classifying steps was formed into a ring-like shape with an outer diameter of 8 mm, an inner diameter of 4 mm and a height of 2 mm. The obtained body was fired at 900° C. for 2 hours. Each obtained ring-like specimen was subjected to permeability measurement using an impedance analyzer.

Example 1, Example 2, Example 3, Example 4, and Example 5 were those with the Sr replacement ratio controlled to be as x=1, x=0.25, x=0.5, x=0.75, and x=1, respectively.

COMPARATIVE EXAMPLES 1 AND 2

A ring-like specimen of Comparative Example 1 was produced in the same manner as Example 2, except that no SrO but only 5 part by weight of $Bi_2O_3$ was added to the preliminarily baked powder obtained by preliminary baking at 1,300° C.

A ring-like specimen of Comparative Example 2 was produced in the same manner as Example 3, except that no SrO but only 5 part by weight of $Bi_2O_3$ was added to the preliminarily baked powder obtained by preliminary baking at 1,300° C.

These obtained ring-like specimens were subjected to permeability measurement similarly to those of the foregoing Examples.

Figure 1:
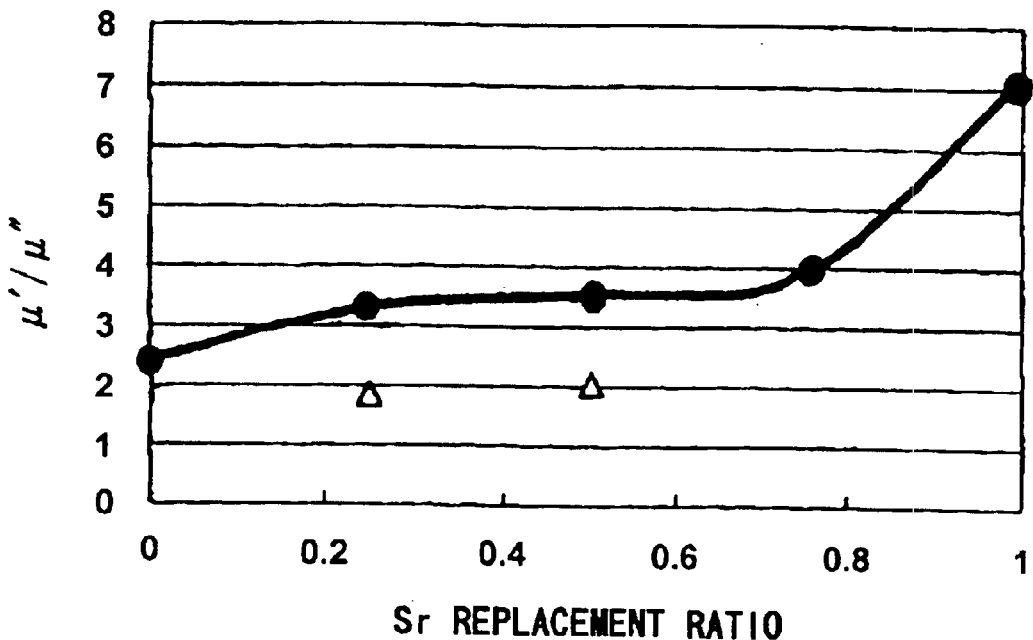
FIG. 1 is a graph showing $\mu'/\mu''$ of an example according to the invention.
Figure 2:
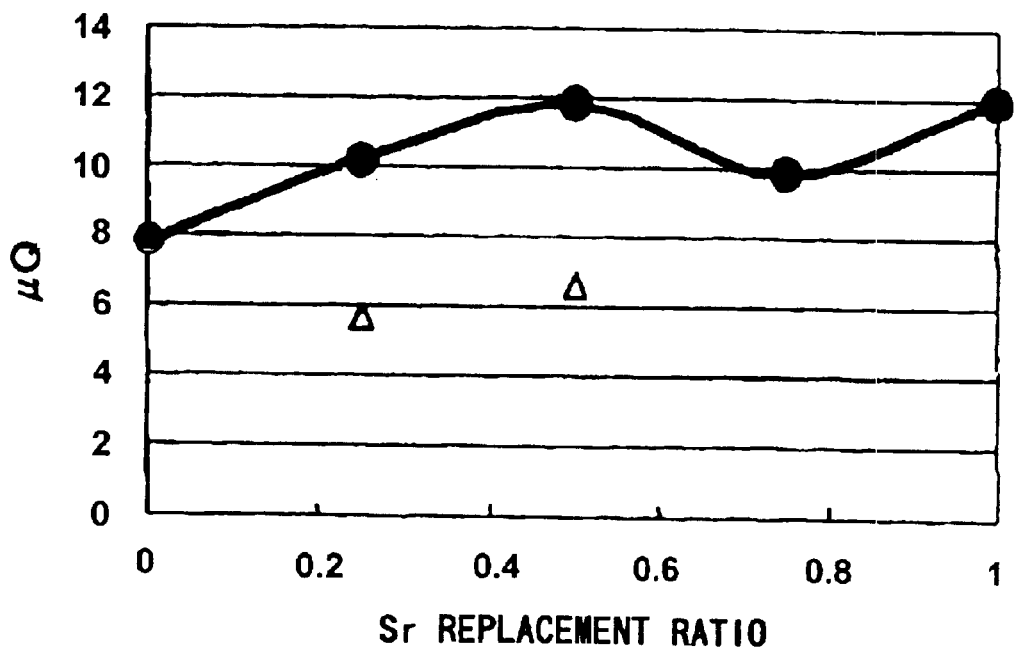
FIG. 2 is a graph showing $\mu Q$ of an example according to the invention.

FIG. 1 and FIG. 2 show graphs showing the results of the permeability measurement of the respective ring-like specimens.

FIG. 1 is a graph showing the relation between the Sr replacement ratio and the ratio $\mu'/\mu''$ (=Q) of the real component $\mu'$ and the imaginary component ($\mu''$) at 1.8 GHz. FIG. 2 is a graph showing the product ($\mu Q$) of the real component $\mu'$ of the permeability and Q at 1.8 GHz. In FIG. 1 and FIG. 2, the ● marks show Examples 1 to 5 and the ● marks show Comparative Examples 1 and 2.

As it is made clear from FIG. 1 and FIG. 2, Examples 1 to 5 were found having higher $\mu'/\mu''$ than that of Comparative Examples 1 and 2 and showing the lowering of magnetic loss. In addition, Examples 1 to 5 were also found having higher $\mu'/\mu''$ in $\mu Q$ than that of Comparative Examples 1 and 2, showing better inductance properties.

Figure 3:
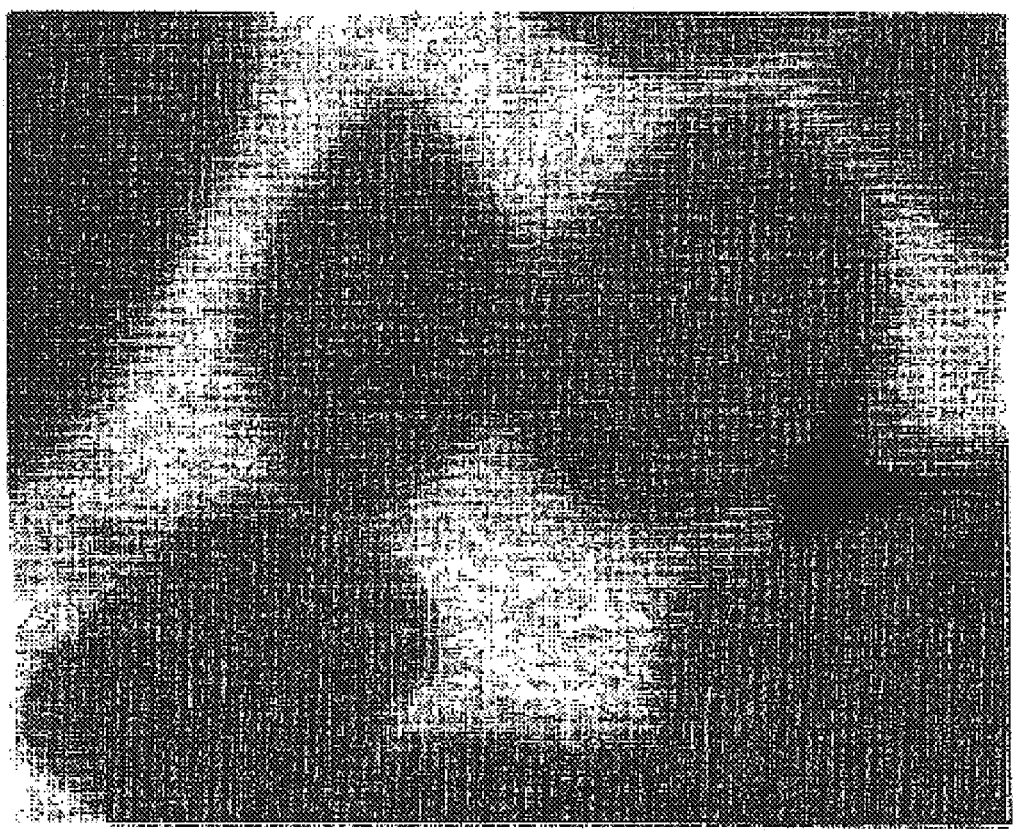
FIG. 3 is a scanning electronic microscopic photograph of a cross-section of an oxide magnetic material of Example 2 according to the invention.
Figure 4:
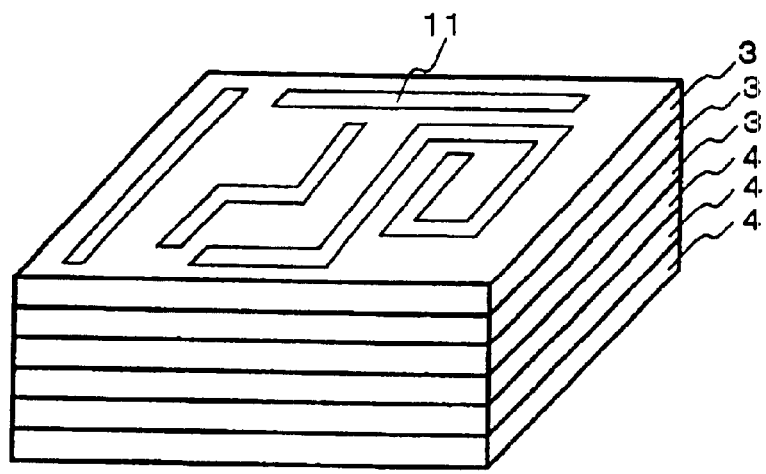
FIG. 4 is a perspective view showing one example of a laminated ceramic substrate.
Figure 5:
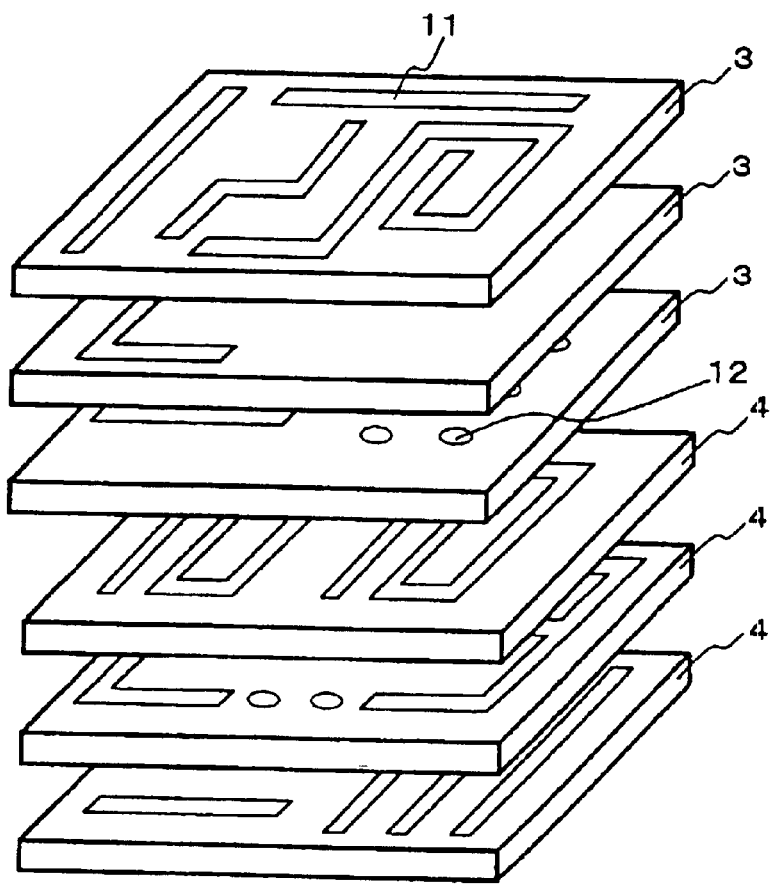
FIG. 5 is an exploded perspective view showing one example of a laminated ceramic substrate.

FIG. 3 is a scanning electron microscopic (SEM) photograph showing a cross-section of the ring-like specimen of Example 2. In FIG. 3, the portions seen relatively white and bright show grain boundary phases and the portions seen relatively black and dark show crystal grains. Incidentally, the average grain diameter of the crystal grains of Example 2 was found to be 0.6 $\mu m$ by measurement. The average grain diameter of the crystal grains of Comparative Example 1 was found to be 4.5 $\mu m$.

The contents of Bi and Sr contained in the grain boundary phases were measured by EPMA. The measurement results are shown in Table 1. With respect to other Examples and Comparative Examples, the contents of Bi and Sr contained in the grain boundary phases were measured in a similar manner. The measurement results are shown in Table 1.

TABLE 1

| | Sr Content (% by weight) | Bi Content (% by weight) |
|---|---|---|
| Ex. 1 | 6 | 39 |
| Ex. 2 | 8 | 35 |
| Ex. 3 | 9 | 34 |
| Ex. 4 | 11 | 34 |
| Ex. 5 | 13 | 33 |
| Comp. Ex. 1 | <1 | 43 |
| Comp. Ex. 2 | 1 | 41 |

As being made clear from Table 1, with respect to Examples 1 to 5 according to the invention, Sr was found existing in a high concentration in the grain boundary phases.

Further, it was found that Bi and Sr existed in form of oxides in the grain boundary phases by XPS.

EXAMPLE 6

Using a slurry after adding and mixing the binder in Example 2 was formed a green sheet by a doctor blade method. Patterning of a Ag paste was carried out on the green sheet by a screen-printing method to form a desired passive circuit. Other green sheets in which different passive circuits were similarly formed were produced and 10 sheets of such green sheets were laminated and press-bonded by a hydroisostatic press and fired at 900° C. to obtain a multi-layer inductor. The obtained multilayer inductor was found having good sintered state.

Further, green sheets of a dielectric material were produced and on the green sheets were similarly layered green sheets made of the above-mentioned oxide magnetic materials of the invention and the respective layered bodies were press-bonded similarly and fired at 900° C. to obtain multilayer inductors. The obtained multilayer inductors were found having good sintered state.

EXAMPLES 7 to 9

After $Bi_2O_3$, SrO, and $SiO_2$ were added at the ratios shown in Table 2 to 96 part by weight of preliminarily fired powders obtained in the same manner as Example 2 and ring-like specimens were produced in the same manner as the foregoing Examples.

TABLE 2

| | $Bi_2O_3$ | SrO | $SiO_2$ |
|---|---|---|---|
| Ex. 7 | 5 part by weight | 1 part by weight | 0.5 part by weight |
| Ex. 8 | 5 part by weight | 1 part by weight | 1.0 part by weight |
| Ex. 9 | 5 part by weight | 1 part by weight | 1.5 part by weight |

The contents of Bi, Sr, and Si contained in the grain boundary phases in the respective specimens of Examples 7 to 9 were measured in the same manner as the foregoing Examples and the results of the measurement are shown in Table 3.

TABLE 3

| | Sr Content (% by weight) | Bi Content (% by weight) | Si Content (% by weight) |
|---|---|---|---|
| Ex. 7 | 7 | 33 | 3 |
| Ex. 8 | 7 | 30 | 6 |
| Ex. 9 | 6 | 27 | 10 |

Similarly to the foregoing Examples, the permeability of each specimen of Examples 7 to 9 was measured and the results of the measurement are shown in Table 4. Further, the shrinkage ratios before and after firing were measured and shown in Table 4. The shrinkage ratios were calculated by measuring the size before firing and the size after firing. Table 4 shows the results of Example 2 and Comparative Example 1 together.

TABLE 4

| | Shrinkage Ratio (%) | $\mu'/\mu''$ (1.8 GHz) | $\mu Q$ (1.8 GHz) |
|---|---|---|---|
| Ex. 7 | 9.6 | 5.64 | 10.87 |
| Ex. 8 | 12.3 | 7.49 | 11.46 |
| Ex. 9 | 13.1 | 9.33 | 15.45 |
| Ex. 2 | 9.0 | 3.32 | 10.17 |
| Comp. Ex. 1 | 0 | 1.85 | 5.64 |

As being made clear from the results shown in Table 4, existence of $SiO_2$ in the grain boundary phases, it was found that the shrinkage ratio at the time of firing was increased and the magnetic properties were also improved. Incidentally, with respect to the oxide magnetic materials of the invention, a Group Ia element or a Group IIa element of a periodic table may be contained. Addition of such an element gives further preferable magnetic properties and makes it possible to carry out firing at a lowered temperature. Such an element can be added in the oxide magnetic materials by adding an additive, a compound of a Group VIIb element with a Group Ia element or a Group IIa element, to oxide magnetic materials.

As the foregoing compound, those having a melting point of 900° C. or lower are preferable to be employed. Practical examples of the foregoing compounds a melting point of 900° C. or lower include $CaCl_2$, KF, KI, NaCl, NaI, $SrBr_2$, $SrCl_2$, $BaBr_2$, $BaI_2$, and the like. Among them, $CaCl_2$ is preferable to be used especially.

EXAMPLE 10

As raw material powders were used 6.77 part by weight of a SrO powder, 10.02 part by weight of a BaO powder, 6.53 part by weight of a CoO powder, and 83.46 part by weight of a $Fe_2O_3$ powder and they are mixed while being pulverized by a ball mill comprising a pot and balls made of zirconia for 24 hours. The obtained mixed powder was preliminarily baked at 1,250° C. for 2 hours to obtain a primarily baked powder of a hexagonal ferrite with the Z-type structure defines as $Sr_{1.5}Ba_{1.5}Co_2Fe_{24}O_{41}$.

After 5 part by weight of a $Bi_2O_3$ powder, 1 part by weight of a SrO powder, and 0.1 part by weight of a $CaCl_2$ powder were added to 93.9 part by weight of the obtained preliminarily baked powder, the resulting powder mixture was mixed again by a ball mill. The obtained mixed powder was press-formed in a ring-like shape and the resulting green body was fired at 900° C. for 2 hours.

The ratio $\mu'/\mu''$ of the obtained ring-like specimen at 1.8 GHz was 3.74 and $\mu Q$ at 1.8 GHz was 13.27. Further, the Sr content in the grain boundary phases was 9% by weight and the Bi content was 34% by weight.

According to the invention, an oxide magnetic material can be produced by low temperature firing and is provided with good magnetic properties in a high frequency band.

What is claimed is:

1. An oxide magnetic material containing Sr, wherein grain boundary phases exist in the surrounding of crystal grains and 2% to 30% by weight of Sr is contained in the grain boundary phases and 10% to 70% by weight of at least one additive element selected from Bi, V, B and Cu is contained in the grain boundary phases.

2. The oxide magnetic material according to claim 1, wherein the additive element is Bi.

3. The oxide magnetic material according to claim 1 being a hexagonal ferrite.

4. The oxide magnetic material according to claim 1, wherein the average grain diameter of the crystal grains is not smaller than 0.01 μm and not larger than 3 μm.

5. The oxide magnetic material according to claim 1 further containing a Group Ia element or a Group IIa element of the periodic table.

6. The oxide magnetic material according to claim 1 further containing not less than 2% by weight of Si in the grain boundary phases.

7. A magnetic substrate made of an oxide magnetic material according to claim 1.

8. A laminated ceramic substrate comprising the magnetic substrate according to claim 7 and a substrate made of another material and laminated on the magnetic substrate.

9. The laminated ceramic substrate according to claim 8, wherein the substrate made of another material is a dielectric substrate.

10. A magnetic substrate comprising an oxide magnetic material according to claim 1.

11. A laminated ceramic substrate comprising the magnetic substrate according to claim 10 and a substrate made of another material.

12. The laminated ceramic substrate according to claim 11, wherein the substrate made of another material is a dielectric substrate.

13. An oxide magnetic material comprising not less than 2% by weight of Sr in the grain boundary phases and not less than 10% by weight of at least one additive element selected from Bi, V, B and Cu, the oxide magnetic material being a hexagonal ferrite, wherein the hexagonal ferrite has a Z phase defined as $M_3Me_2Fe_{24}O_{41}$ as a main phases, wherein M is Ba and/or Sr, and Me is a bivalent metal.

14. The oxide magnetic material according to claim 13, wherein the main phase is defined as $(Sr_xBa_{1-x})_3Me_2Fe_{24}O_{41}$ and x is a value satisfying $0 \leq x \leq 1$.

* * * * *